United States Patent
Kitagawa

(10) Patent No.: US 6,631,942 B1
(45) Date of Patent: Oct. 14, 2003

(54) FRONT BODY STRUCTURE FOR VEHICLE

(75) Inventor: Yuichi Kitagawa, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/176,632

(22) Filed: Jun. 24, 2002

(30) Foreign Application Priority Data

Jun. 26, 2001 (JP) ..................... P2001-192155

(51) Int. Cl.$^7$ ............................... B62D 21/00
(52) U.S. Cl. ............... 296/188; 296/198; 296/203.02; 296/30; 296/189
(58) Field of Search ............... 296/188, 189, 296/198, 194, 203.02, 203.03, 204, 203.01, 193, 29, 30; 280/784, 797

(56) References Cited

U.S. PATENT DOCUMENTS

| 3,881,742 | A | | 5/1975 | Felzer |
| 4,909,565 | A | * | 3/1990 | Harasaki et al. ............ 296/189 |
| 5,011,201 | A | * | 4/1991 | Takahashi et al. ..... 296/203.02 |
| 5,685,599 | A | | 11/1997 | Kitagawa |
| 6,286,867 | B1 | * | 9/2001 | Braemig et al. ............ 280/784 |
| 2001/0024053 | A1 | * | 9/2001 | Takase et al. ............... 296/189 |

FOREIGN PATENT DOCUMENTS

| DE | 3243756 | 11/1982 |
| EP | 07267148 | 10/1995 |
| EP | 0 980 815 | 2/2000 |
| JP | 5-124542 | 5/1993 |
| JP | 7-267148 | 10/1995 |

* cited by examiner

Primary Examiner—D. Glenn Dayoan
Assistant Examiner—Jason Morrow
(74) Attorney, Agent, or Firm—McDermott, Will & Emery

(57) ABSTRACT

A front body structure is provided to disperse an impact load transmitted from a tire retreating while changing its direction, into a vehicle body effectively and also effect a great absorption of an impact energy. Forming a body framework on the lateral side of a vehicle cabin, a body side frame includes a side-frame inner panel inside the vehicle cabin and a side-frame outer panel outside the vehicle cabin. Extending from the vicinity of a joint between a side member and a dash panel to the body side frame, a torque box includes a torque-box inner panel inside the vehicle cabin and a torque-box outer panel outside the vehicle cabin. In arrangement, a front tire and a wheel are arranged on the side of the torque-box outer panel of the torque box. The body side frame is connected with the torque box so that a surface of the side-frame outer panel connects a surface of the torque-box outer panel.

8 Claims, 13 Drawing Sheets

FRONT BODY STRUCTURE FOR VEHICLE

BACKGROUND OF THE INVENTION

1. Field of the Invention

The present invention relates to a front body structure for a vehicle. More particularly, it relates a front body structure which can make a body side frame absorb and disperse an impact load via a front tire effectively when the vehicle has a front collision so that the front tire interferes with the body side frame.

2. Description of the Related Art

Japanese Patent Publication (kokai) Nos. 5-124542 and 7-267148 each discloses a front body structure on the assumption of the above front collision. In this front body structure, a torque box (or torque-transmitting box) is arranged between a side member and a body side frame on each lateral side of the vehicle body, for dispersing an impact load via the front tire at the vehicle collision.

In the front body structure of Japanese Patent Publication No. 7-267148, the body side frame is provided, on its front end, with a projection which allows the deformation mode of the vehicle body to be controlled while absorbing an impact energy at the vehicle collision.

SUMMARY OF THE INVENTION

In the front body structure of Japanese Patent Publication No. 5-124542, there is a possibility of the concentration of stress on the torque box unless the tire turns sideways completely.

In the front body structure of Japanese Patent Publication No. 7-267148, a desired effect is difficult to expect in case of the tire's retreating while changing its direction (toe-out).

Under the above circumstance, it is an object of the present invention to provide a front body structure which can disperse an impact load, which has been transmitted from a tire retreating while changing its direction, into the whole vehicle body effectively and which can effect a great absorption of the impact energy.

According to the present invention, the above-mentioned object is accomplished by a front body structure for a vehicle, comprising: an engine room arranged in front of a vehicle cabin, for accommodating a power unit for a vehicle; a dash panel disposed between the engine room and the vehicle cabin; a side member arranged in each lateral side of the vehicle to extend from the engine room to the underside of a cabin floor defining the vehicle cabin, in a fore-and-aft direction of vehicle continuously; a body side frame having a side-frame inner panel arranged inside the vehicle cabin and a side-frame outer panel arranged outside the vehicle cabin thereby to form a body framework on the lateral side of the vehicle cabin; and a torque box formed to extend from the vicinity of a joint between the side member and the dash panel to the body side frame, in the form of a box having a torque-box inner panel inside the vehicle cabin and a torque-box outer panel outside the vehicle cabin. In this front body structure of the invention, a front tire and a wheel are arranged on the side of the torque-box outer panel of the torque box. Further, the body side frame is connected with the torque box in a manner that an outside surface of the side-frame outer panel substantially connects an outside surface of the torque-box outer panel.

Alternatively, the object of the present invention can be accomplished by a front body structure for a vehicle, comprising: an engine room arranged in front of a vehicle cabin, for accommodating a power unit for a vehicle; a dash panel disposed between the engine room and the vehicle cabin; a side member arranged in each lateral side of the vehicle to extend from the engine room to the underside of a cabin floor defining the vehicle cabin, in a fore-and-aft direction of vehicle continuously; a body side frame arranged to form a body framework on the lateral side of the vehicle cabin; and a torque box connected to the side member and the body side frame, the torque box being made of a casting. Also in this front body structure, a front tire and a wheel are arranged outside the torque box. Besides, the side member and the body side frame are together made of extrusions having their ends adhesively connected with the torque box. The body side frame is connected with the torque box so that an outside surface of the body side frame substantially connects an outside surface of the torque box.

BRIEF DESCRIPTION OF THE DRAWINGS

FIGS. 4A and 4B show the first embodiment of the invention: in which FIG. 4A is a perspective view of the front body structure and FIG. 4B is a plan view of FIG. 4A;

FIGS. 6A and 6B show the second embodiment of the invention: in which FIG. 6A is a perspective view of the front body structure and FIG. 6B is a plan view of FIG. 6A;

FIGS. 10A and 10B are views showing the third embodiment of the invention: in which FIG. 10A is a perspective view of the front body structure and FIG. 10B is a plan view of FIG. 10A;

DESCRIPTION OF THE PREFERRED EMBODIMENT

Referring to the accompanying drawings, various embodiments of the present invention will be described below.

Figure 1:
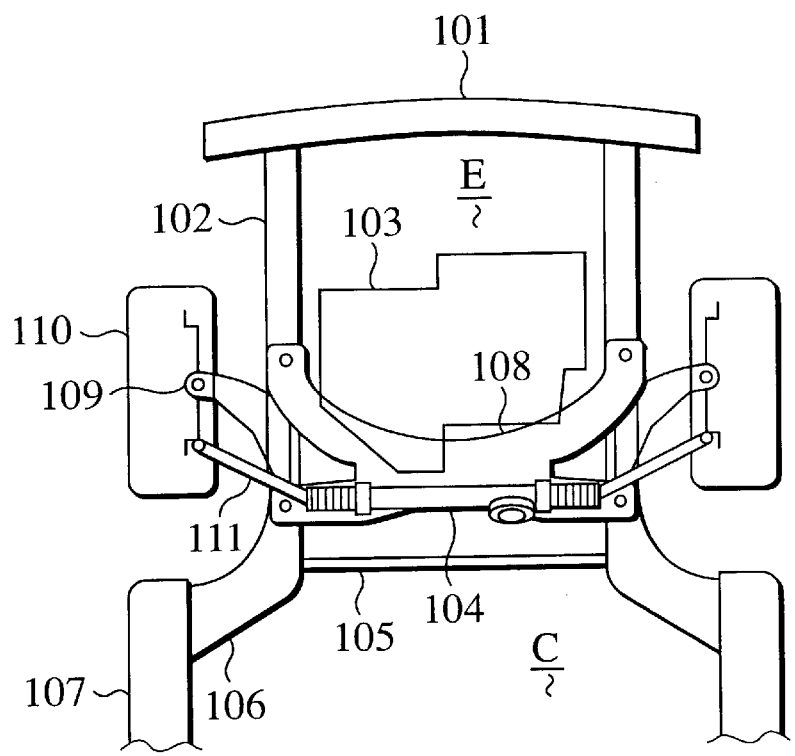
FIG. 1 is a plan view of a front body structure to which an embodiment of the present invention is applied.

In the figures, FIG. 1 shows the overall constitution of an automotive front body structure to be improved by an embodiment of the present invention. The shown automotive front structure includes a bumper 101 in the forefront end of a vehicle and a pair of left/right side members 102 extending backward. A power unit 103, such as engine and transmission, is disposed in a space interposed between the left/right side members 102, that is, an engine room E.

The left/right side members 102 are formed to turn toward a vehicle floor at a dash panel 105 between the engine room E and a vehicle cabin C. At the joint to the dash panel 105, the rear end of each side member 102 is connected with one end of a torque box 106. The other end of the torque box 106 is connected to a body side frame 107 forming a lateral framework of the vehicle cabin C. Arranged between the power unit 103 and the dash panel 105 is a suspension frame 108 whose both ends are fixed to the left/right side members 102. On each side of the vehicle, a front tire 110 is pivoted to a leading end of a link 109 extending from the suspension frame 108. A steering rack 104 is arranged above the suspension frame 108. A pair of tie rods 111 are formed to extend from both ends of the steering rack 104 outward and finally linked to the front tires 110. That is, the front tires 110 including wheels are positioned outside the torque boxes 106 in directions toward the respective outer panels (not shown).

Figure 2:
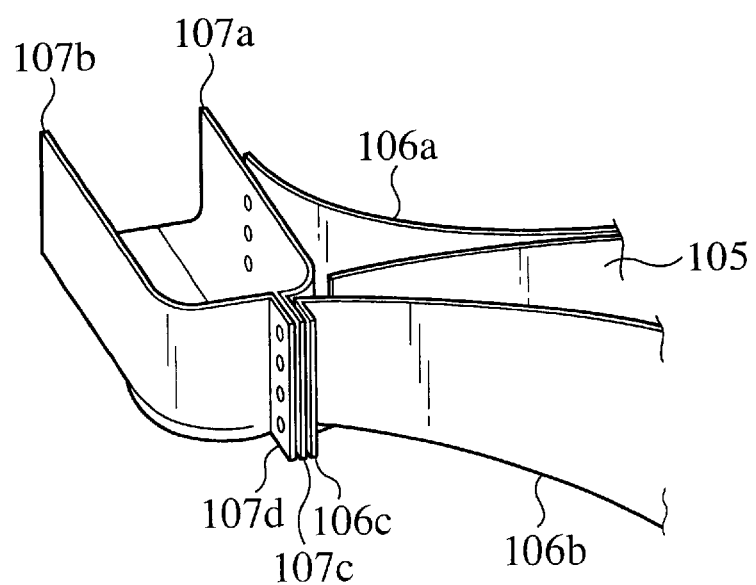
FIG. 2 is an enlarged perspective view of the front body structure to which an embodiment of the present invention is applied.

FIG. 2 shows a connection between the torque box 106 and the body side frame 107 on the right-hand side of a vehicle body, forming an essential part of the invention. The body side frame 107 is formed by a side-frame inner panel 107a and a side-frame outer panel 107b. In order to accomplish a welding work with ease, the side-frame inner panel 107a is provided with a flange 107c folded outward, while the side-frame outer panel 107b is provided with a flange 107d folded outward. In assembling, by spot-welding both of the flanges 107c, 107d to each other, the side-frame inner panel 107a and the side-frame outer panel 107b form the body side frame 107 having a closed cross section. On the other hand, the torque box 106 is formed by a torque-box inner panel 106a and a torque-box outer panel 106b. In view of an easy welding work, the torque-box outer panel 106b is provided with a flange 106c folded outward. In assembling, by spot-welding the above flange 106c to the flanges 107d, 107c, the torque box 106 is provided with a closed cross section while interposing the dash panel 105 between the torque-box inner panel 106a and the torque-box outer panel 106b.

Figure 3:
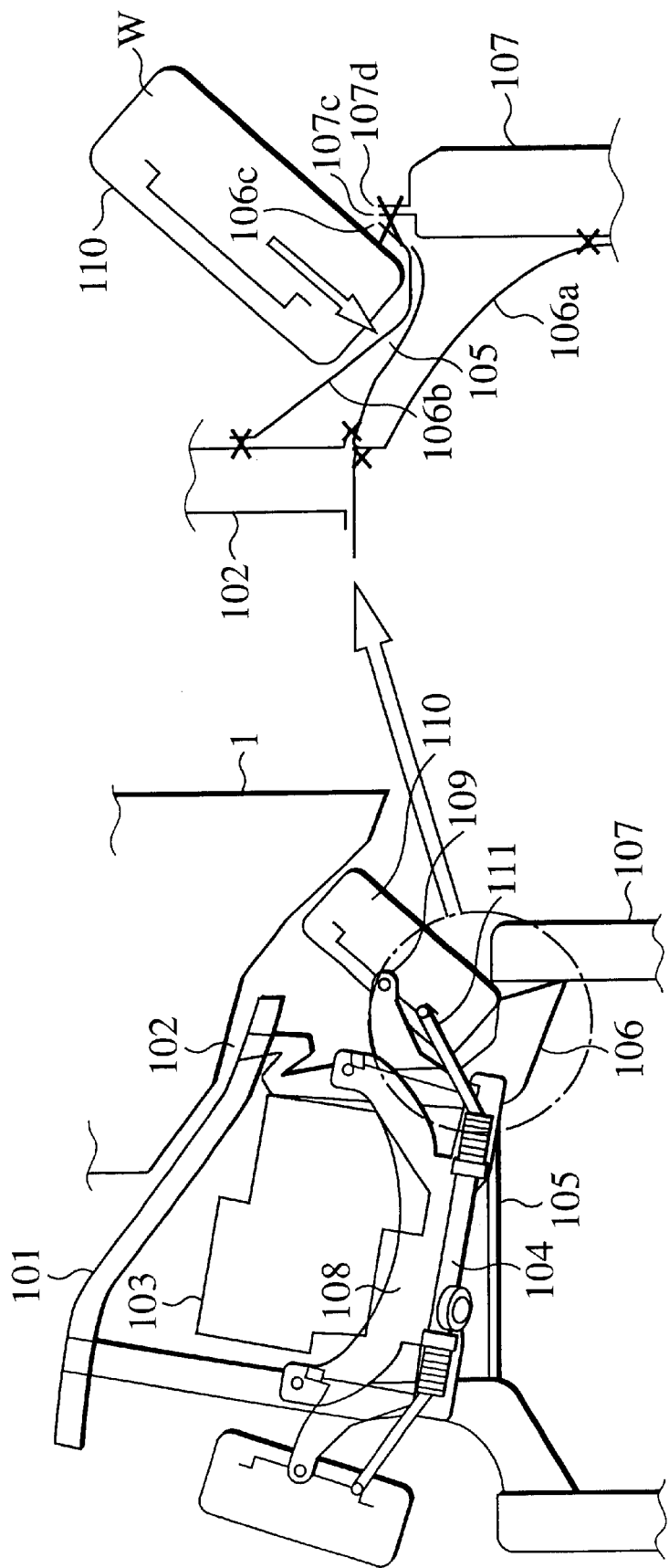
FIG. 3A is a plan view of the front body structure and FIG. 3B is a partially enlarged view of FIG. 3A, for explanation of a problem to be solved by the front body structure.

FIGS. 3A and 3B are views for explanation of a challenge to be solved in the automotive front structure mentioned above. In these figures, FIG. 3A shows the deformation mode of a front body when the right side of the vehicle has an offset collision with an object 1. In such a collision, not only the power unit 103 but the right tire 110 is subjected to an impact through the object 1. Then, since the link 109 is constructed by a remarkably-solid member, an input through the tire 110 causes the suspension frame 108 to be rotated in the clockwise direction in the figure while moving back.

Since the steering rack 104 is generally secured to the suspension frame 108, the rack 104 is also rotated in the same direction to draw the tie rod 111, so that the tire 110 is steered to a so-called "toe-out" direction. Subsequently, with the progress of deformation, the rear face of the tire 110 comes into contact with the torque box 106. Since the torque box 106 is pressed by the tire 110, the box 106 is subjected to a force to draw the front end of the body side frame 107 to the inside of the vehicle body. As mentioned before, since the structure of FIG. 2 has the torque-box outer panel 106b and the side-frame outer panel 107b joined to each other by spot-welding the upright flanges 106c, 107b to each other, the above drawing force acts to cancel the spot-welding established between the flanges. Under such a situation, if the load input through the tire 110 is excessive, there arises a possibility that a separation is produced in the spot-welding part to cut off a load-transmission route from the torque box 106 to the body side frame 107, as shown in FIG. 3B.

To the contrary, throughout the following embodiments, a torque box having an torque-box inner panel 106a inside the vehicle cabin and an outer panel 106b outside the vehicle cabin is formed to extend from the joint between the side member 102 and the dash panel 105 to the body side frame 107. In arrangement, the front tire 110 and a wheel W are positioned on the side of the torque-box inner panel 106b of the torque box 106 and furthermore, the body side frame 107 has its outside face formed in succession with an outside face of the torque box 106. Note, in the following embodiments, elements similar to those of the above-mentioned front body structure are indicated with the same reference numerals, respectively.

1st. Embodiment

Figure 4:
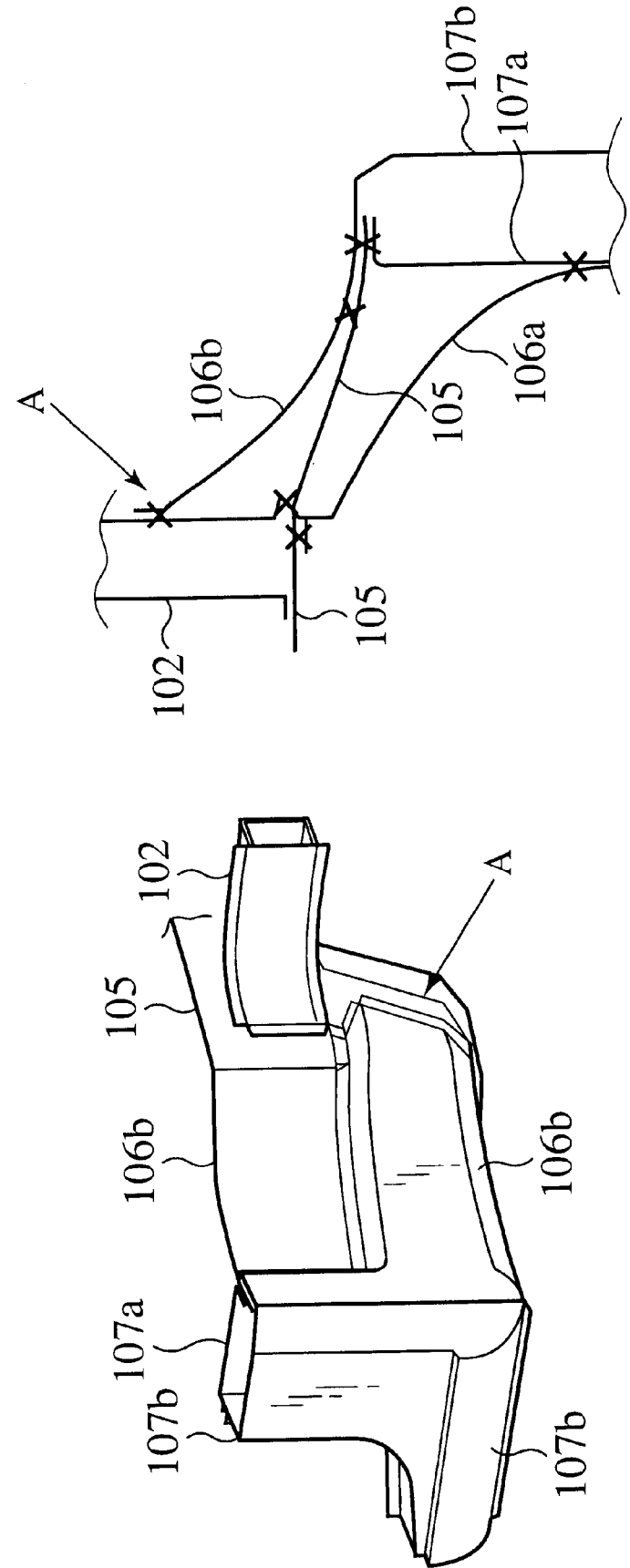

FIGS. 4A and 4B show the right side member 106 and the body side frame 107 in accordance with the first embodiment of the present invention. At the dash panel 105 separating the engine room from the vehicle cabin, the direction of the side member 102 is changed so as to extend toward the vehicle floor. The body side frame 107 is formed by the inner panel 107a inside the vehicle cabin and the outer panel 107b outside the vehicle cabin. The torque-box inner panel 106a is arranged so as to bridge between the inner panel's inside part (107a) close to the front end of the body side frame 107 and the dash panel's inside part (105) corresponding to the rear end of the side member 102. On the other hand, the torque-box outer panel 106b is arranged outside the dash panel 105 so as to bridge between the vicinity of the side member's rear end (102) and the front end of the body side frame 107.

The feature of this embodiment resides in the provision of the torque-box outer panel 106b and the side-frame outer panel 107b in the form of one sheet of successive panel. In detail, the successive panel has its front end (corresponding to the torque-box outer panel 106b) spot-welded to the side member 102 at a position A of figures, and the rear part formed to extend up to the rear side of the vehicle body (corresponding to the body side frame 107b).

Figure 5:
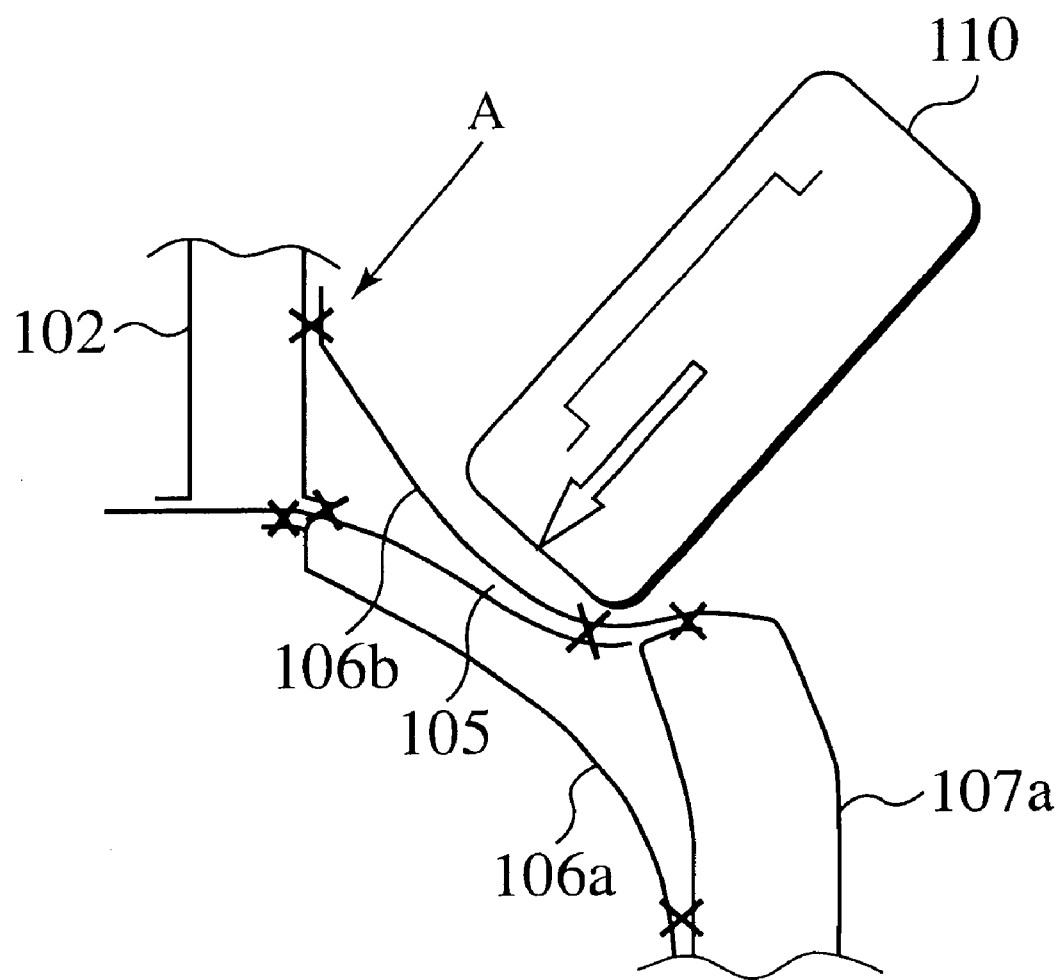
FIG. 5 is a plan view showing the operation of the front body structure of the first embodiment of the invention.

FIG. 5 is a view for explanation of the operation and effect of the above-mentioned structure at the vehicle "offset" collision described before.

According to the embodiment, since the torque-box outer panel 106b and the side-frame outer panel 107b are formed by a continuous panel, the above drawing force is sufficiently transmitted to the front end of the body side frame 107 by the time of reaching a breaking strength of the panel, so that the bending strength of the body side frame 107 acts as a resistance against the retreat of the tire 110. Here, it is generally noted that the body side frame 107 is designed with a large width in section and also a large thickness on the assumption that the frame 107 would interfere with the front tire 110 at the front collision or the vehicle would have a side collision with the object 1. Therefore, the so-designed body side frame 107 is capable of exhibiting a sufficient resistance against the above-mentioned input (load).

Although the front end A of the torque-box outer panel 106b is also subjected to a large tensile force, it acts on the spot-welding parts between the same panel 106b and the side member 102, in the form of a shearing force. Note, it is well-known that the spot welding can take a strong resistance against a shearing force rather than a separation force (described later in detail). Thus, according to the embodiment, even if the tire 110 does not interfere with the body side frame 107 directly, the strength of the frame 107 can be utilized effectively, whereby it is possible to reduce the deformation of vehicle body.

According to the first embodiment of the invention, owing to the provision of a single panel serving as the torque-box outer panel 106b and the side-frame outer panel 107b, it is possible to reduce the number of components in comparison with the conventional structure. Further, since the magnitude of a load transmitted from the torque box 106 to the body side frame 107 is determined by the strength of a steel material used for the panel, the adoption of a steel plate having a high strength for breakage would accomplish a high efficiency in transmitting the impact load with ease.

2nd. Embodiment

Figure 6B:
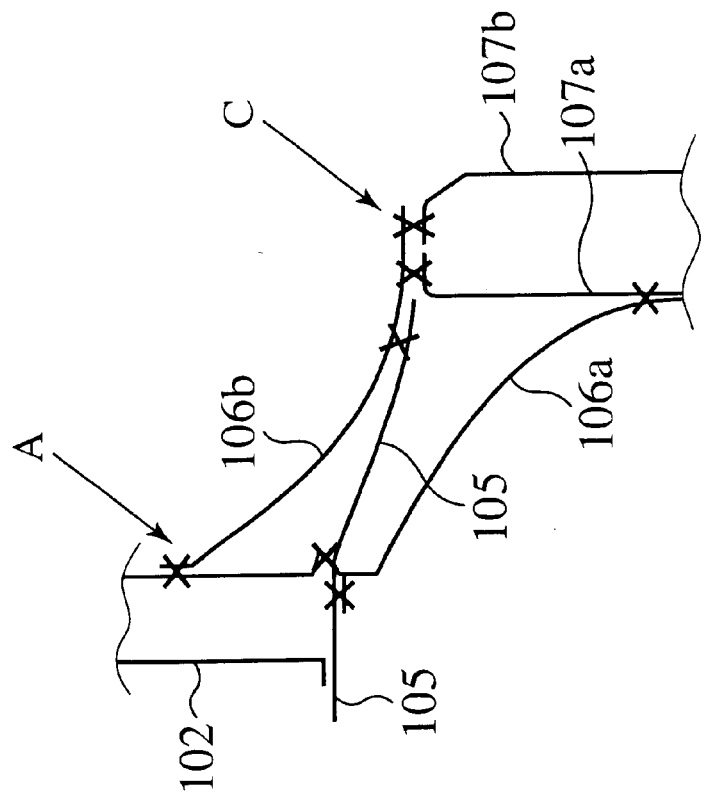
Figure 6A:
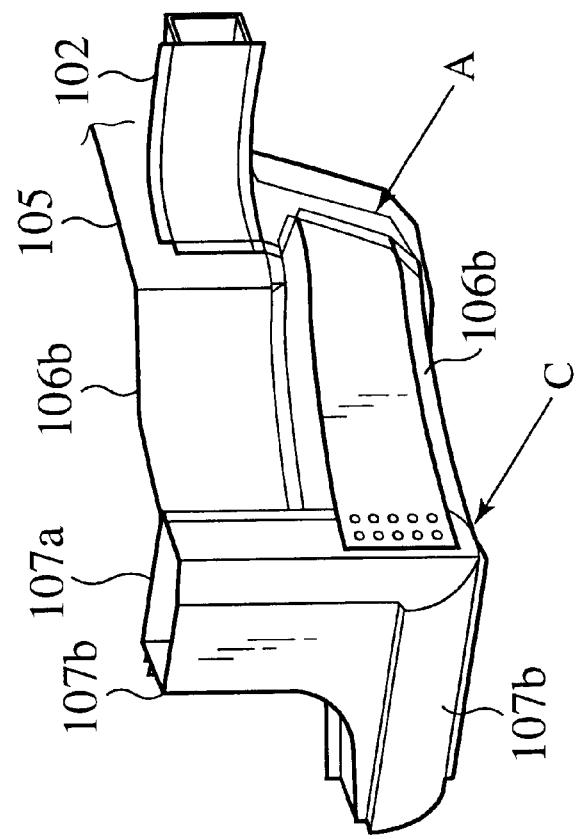

FIGS. 6A and 6B show the second embodiment of the invention. Different from the first embodiment, the torque-box outer panel 106b and the side-frame outer panel 107b are provided by different members respectively; nevertheless these members are laid to partially overlap each other at the front end (see arrow C) of the body side frame 107 and further joined to each other by spot-welding.

Figure 7:
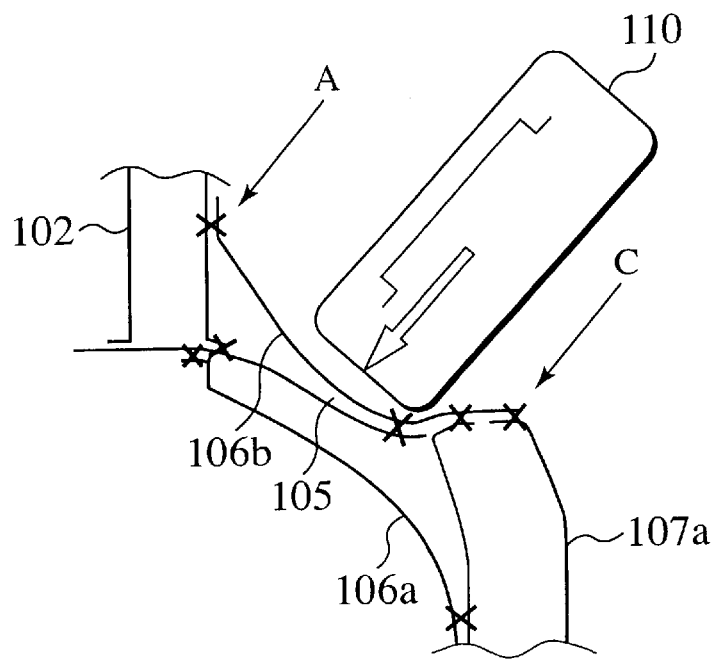
FIG. 7 is a plan view showing the operation of the front body structure of the second embodiment of the invention.
Figure 8A:
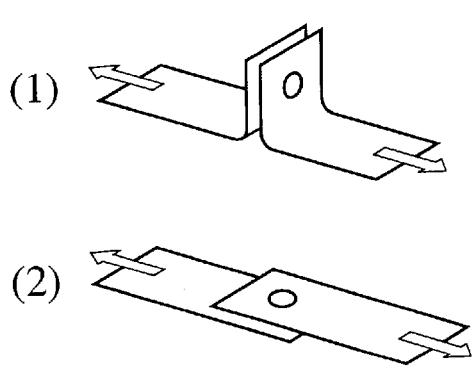
FIG. 8A shows test pieces provided for a high-speed tensile test.
Figure 8B:
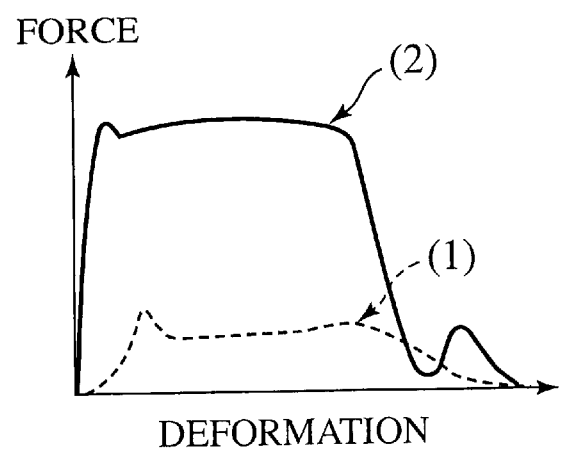
FIG. 8B is a graph showing the result of the high-speed tensile test.

FIG. 7 is a view for explanation of the operation and effect of the above-mentioned structure when the vehicle has an offset collision described before. Due to this offset collision, the front tire 110 moves back while being steered to the "toe-out" direction and comes into contact with the torque-box outer panel 106b inside the front end of the body side frame 107. It is noted that a contact point of the tire 110 with the panel 106b is positioned inside the above overlapping part C though the point is dependent on the steering angle. When the tire 110 presses the torque-box outer panel 106b, it is subjected to a force to draw the front end of the body side frame 107 to the inside of the vehicle body. According to the embodiment, since the panels 106b, 107b are laid to partially overlap each other and joined to each other by spot-welding at the resultant overlapping part C, the above drawing force operates as a shearing force on the part C. With the inventors try of a high-speed tensile experiment using test pieces shown in FIG. 8, it is found that the connection resulting from the spot welding can exhibit a high resistance against a shearing force (2) rather than a separation force (1). With the above-mentioned connection between the torque-box outer panel 106b and the side-frame outer panel 107b, since a load exerted on the torque-box outer panel 106b is transmitted to the front end of the body side frame 107 through the spot-welding points, the bending strength of the body side frame 107 as a whole can be useful for a resistance against the retreat of the tire 110. Although the load transmission from the torque-box outer panel 106b to the side-frame outer panel 107b depends on the strength of spot-welding at the joint part C, this embodiment has the advantage of press-working the side-frame outer panel 107b with ease because of its reduced pressing extent up to the vicinity of the joint part C.

Figure 9A:
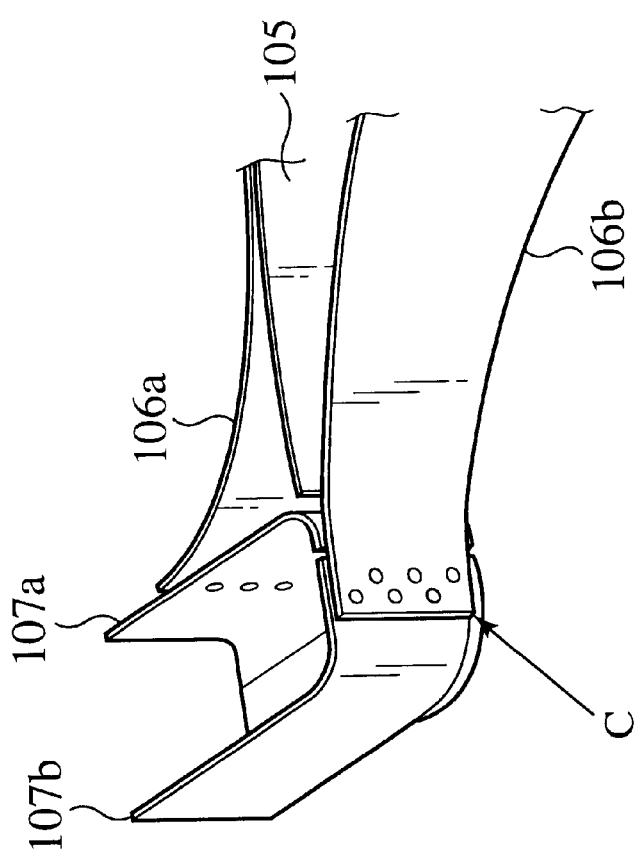
FIGS. 9A and 9B are perspective views showing examples of spot welding points in accordance with the second embodiment of the invention.
Figure 9B:
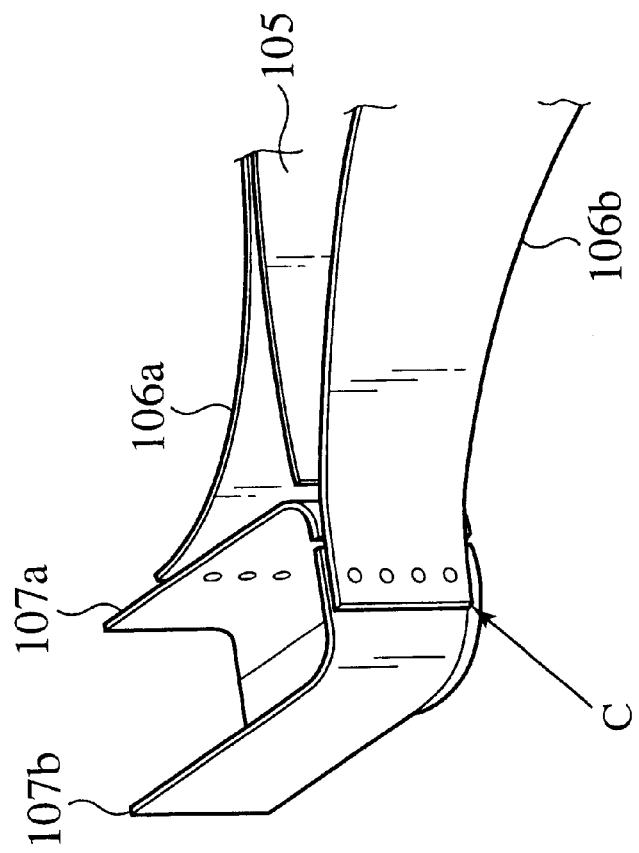

FIGS. 9A and 9B show examples of the spot-welding points of this embodiment. In view that the breakage in the spot-welding area is mostly caused by the development of cracks produced in the vicinity of the spot-welding points, it is desired that the load transmitted from the torque-box outer panel 106b is dispersed to many spot-welding points as possible. In the example of FIG. 9A, the spot-welding points are arranged in the up-and-down direction of vehicle body. In the modification, the spot-welding points may be alternately arranged in zigzags, as shown in FIG. 9B. Additionally, even when connecting the torque-box outer panel 106b with the side-frame outer panel 107b by means of laser-welding or arc-welding (not shown), the above load-dispersion effect can be expected owing to the formation of the resultant linear welding part.

Meanwhile, it should be noted that the spot-welding using a general production machine requires a process to pinch the panels to be united between spot guns. Therefore, since the side-frame inner panel 107a and the side-frame outer panel 107b of the embodiment form a bag-shaped structure, it is necessary to form a hole for allowing one spot gun to be inserted into the panel. As to the provision of the above hole, a not-shown drain hole on the bottom of the body side frame 107 may be substituted for this hole. Alternatively, the body side frame 107 may be provided, on its side face, with a special hole to be closed by a cap after assembling the vehicle body.

According to the second embodiment, since the side-frame outer panel 107b is connected with the torque-box outer panel 106b by welding, it is possible to ensure a high connecting strength in spite of a small number of manufacturing processes. Further, the increasing of welding area would allow the connection strength to be enhanced.

3rd. Embodiment

Figure 10B:
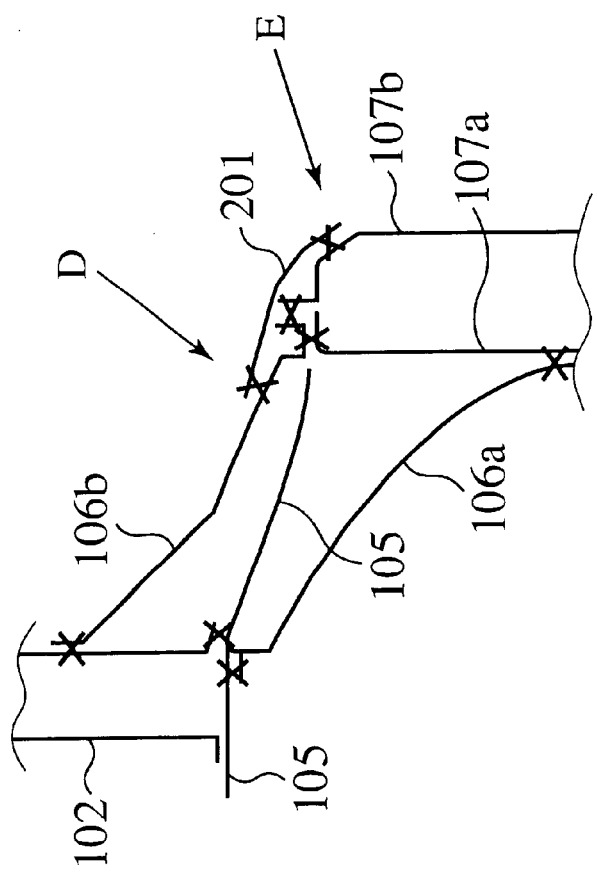
Figure 10A:
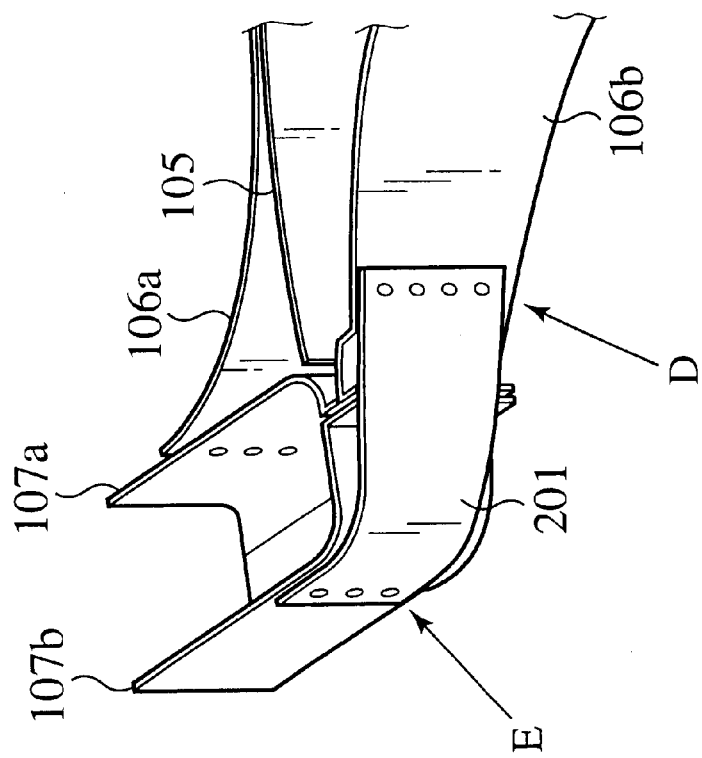

FIGS. 10A and 10B are views showing the third embodiment of the invention. Similarly to the second embodiment of the invention, the torque-box outer panel 106b and the side-frame outer panel 107b are provided by different members respectively, but respective front ends of the panels 106b, 107b are together folded back and welded to each other.

Further, the remarkable feature of the embodiment resides in the provision of a plate 201 which overlaps with both of the torque-box outer panel 106b and the side-frame outer panel 107b. The plate 201 is spot-welded to the torque-box outer panel 106b at an overlapping part D and the side-frame outer panel 107b at an overlapping part E.

Figure 11:
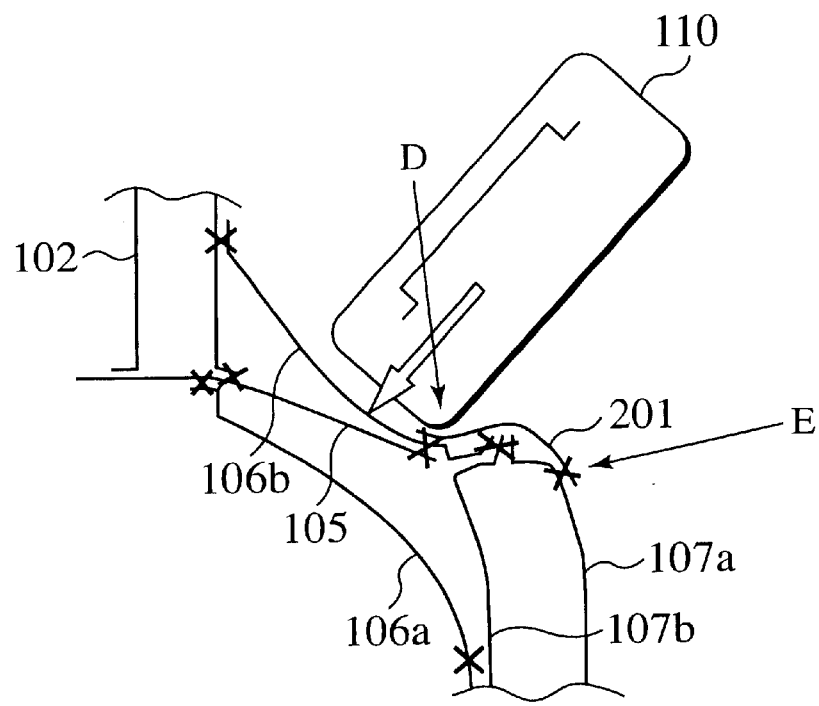
FIG. 11 is a plan view showing the operation of the front body structure of the third embodiment of the invention.

FIG. 11 is a view for explanation of the operation and effect of the above-mentioned structure when the vehicle has an offset collision described before. Due to this collision, when the front tire 110 moves back while being steered to the "toe-out" direction and comes into contact with the torque-box outer panel 106b inside the front end of the body side frame 107, the tire 110 presses the torque-box outer panel 106b, so that it is subjected to a force to draw the front end of the body side frame 107 to the inside of the vehicle body. According to the embodiment, since the plate 201 is piled and welded to both of the torque-box outer panel 106b and the side-frame outer panel 107b by spot-welding, the above drawing force acts as a shearing force against the overlapping (welding) parts D, E. As mentioned in the first embodiment, the spot welding can take a strong resistance against a shearing force and therefore, there is an expectation that the impact load on the torque-box outer panel 106b is sufficiently transmitted to the body side frame 107 through the plate 210 and the bending strength of the body side frame 107 as a whole can be useful for a resistance against the retreat of the tire 110. In order to remove a separation force applied on the spot-welding parts completely, it is desirable to extend the welding part D up to a position to interfere with the tire 110 or the inside of vehicle body. According to the embodiment, owing to the adoption of the plate 201 for enhancing the joint between the torque-box outer panel 106b and the side-frame outer panel 107b, it is possible to assemble the vehicle body in accordance with the conventional production method. Note, if it is difficult to join the plate 201 to the panels 106b, 107 by spot-welding, it may be replaced by laser-welding or arc-welding.

According to the third embodiment of the invention, since the torque-box outer panel 106b is connected with the side-frame outer panel 107b through the plate 201, it is possible to ensure a high connection strength between the panels 106b, 107b through the intermediary of the plate 201.

4th. Embodiment

Figure 12:
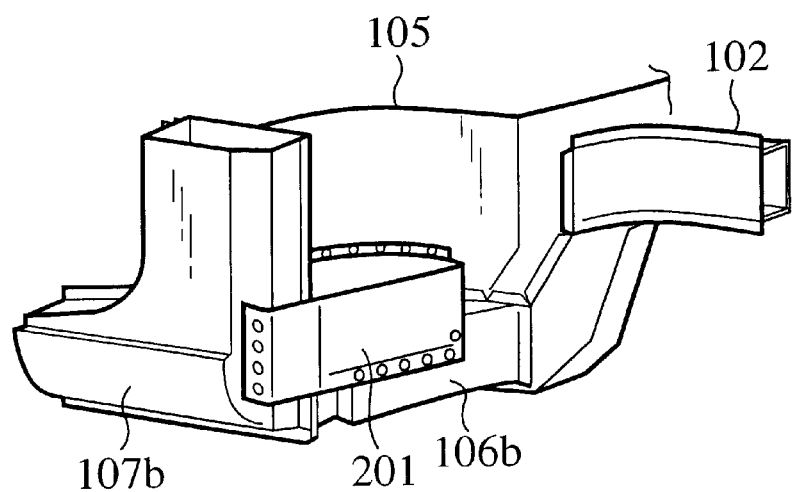
FIG. 12 is a perspective view of the front body structure of the fourth embodiment of the invention.

FIG. 12 shows the fourth embodiment of the invention. The basic constitution of this embodiment is similar to that of the third embodiment, but the plate 201 for connecting the torque-box outer panel 106b to the side-frame outer panel 107b is arranged in a position higher than that of the third embodiment. As shown in the figure, the level of the plate 201 is higher than the axis of the body side frame 107 and is positioned close to the center axis of the tire 110, so that the plate 201 projects from the torque-box outer panel 106b upward.

Figure 13A:
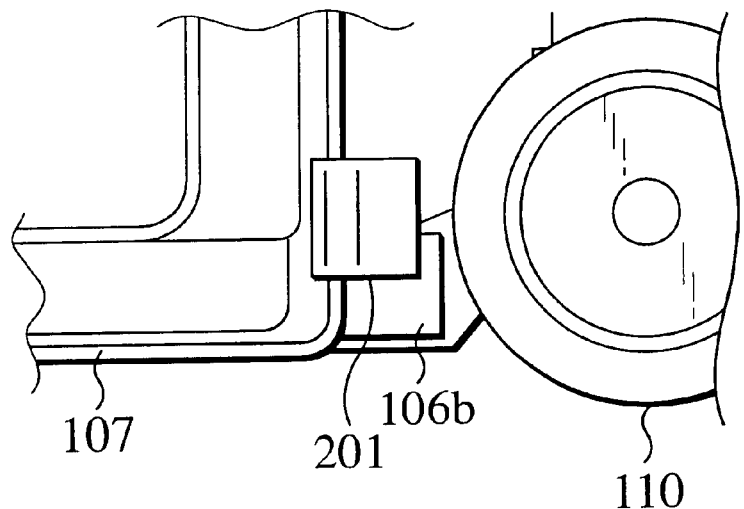
FIGS. 13A and 13B are views showing the operation of the front body structure of the fourth embodiment of the invention.
Figure 13B:
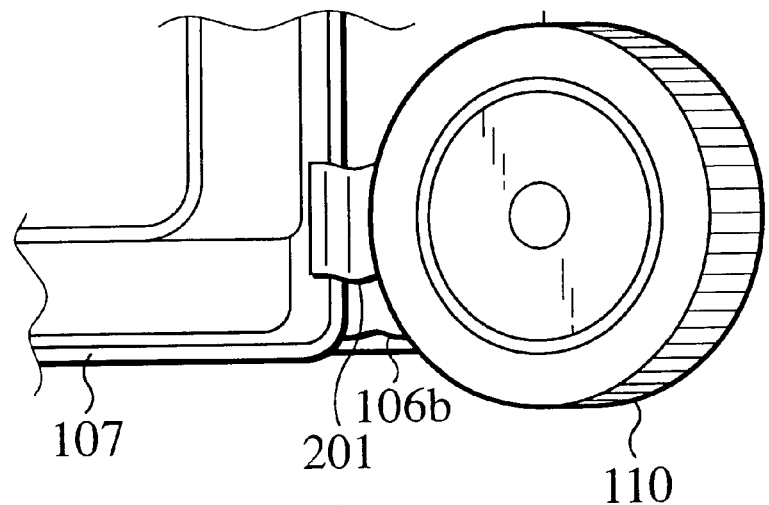

FIGS. 13A and 13B show the relationship in position between the plate 201 and the tire 110 at the vehicle collision. According to the embodiment, since the input (load) on the tire 110 is transmitted to the plate 201 directly, it is possible to accomplish the load-transmission of the plate 201 effectively. Additionally, since the position of the plate 201 welded to the side-frame outer panel 107b is established above the axis of the body side frame 107 and within an area included in an upright frame serving as a front pillar, it is possible to utilize the torsional rigidity of the front pillar for the resistance against the impact.

According to the fourth embodiment of the invention, depending on the shape and length of the plate 201, it is possible to design the welding position between the torque-box outer panel 106b and the side-frame outer panel 107b relatively freely.

5th. Embodiment

Figure 14:
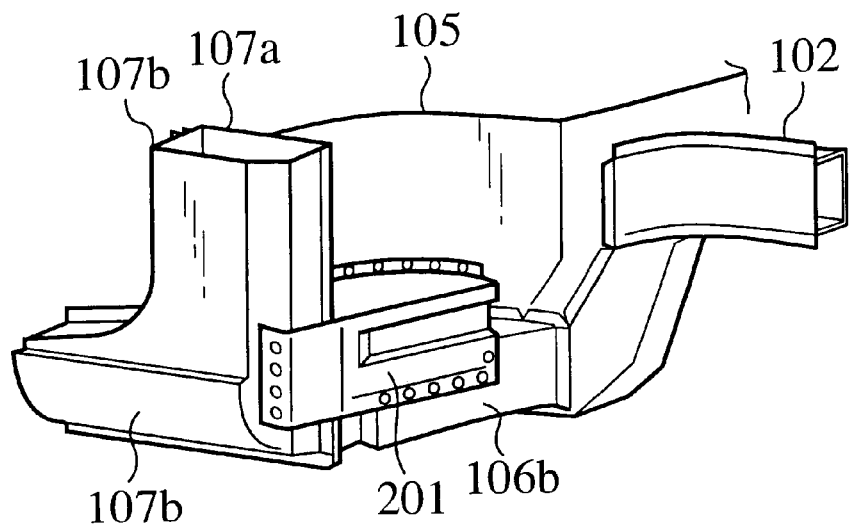
FIG. 14 is a perspective view of the front body structure of the fifth embodiment of the invention.

FIG. 14 shows the fifth embodiment of the invention. Different from the plate 201 of the fourth embodiment, the plate 201 of this embodiment is provided with a channel. Owing to the provision of the channel, it is possible to allow the plate 201 to operate as an energy-absorbing member besides its load-transmission effect.

6th. Embodiment

Figure 15:
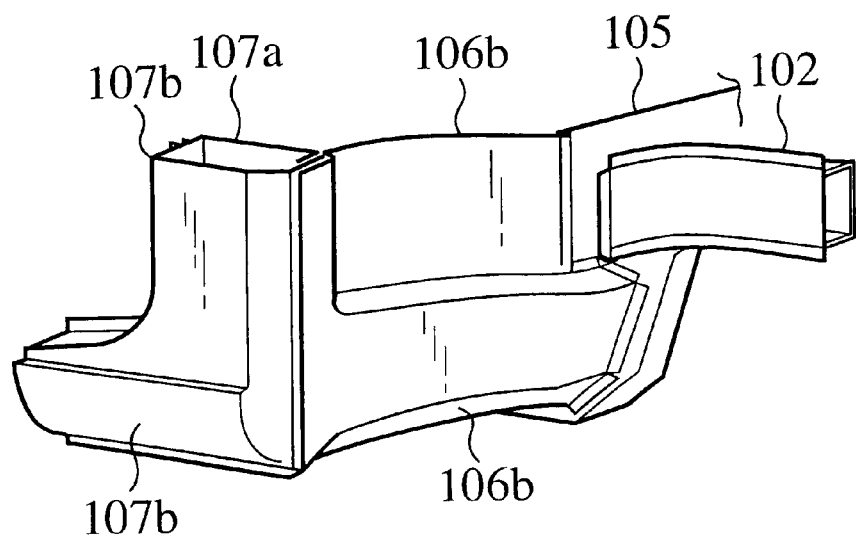
FIG. 15 is a perspective view of the front body structure of the sixth embodiment of the invention.

FIG. 15 shows the sixth embodiment of the invention. In this embodiment, the plate 201 and the torque-box outer panel 106b of the fourth embodiment are formed into one body, providing a large-sized torque-box outer panel 106b.

In comparison with the dash panel 105 of the fourth embodiment (see FIG. 12), the dash panel 105 of the embodiment is narrow in the left-and-right (width) direction of vehicle. That is, the torque-box outer panel 106b is formed so as to cover all the area in contact with the tire at the vehicle collision. Additionally, the torque-box outer panel 106b is provided with ridgelines corresponding to those on the conventional torque box. According to the sixth embodiment, although the torque-box outer panel 106b itself is large-sized, it is possible to reduce the number of components in comparison with that of the fourth embodiment, facilitating their forming/processing and also assembling.

7th. Embodiment

Figure 16:
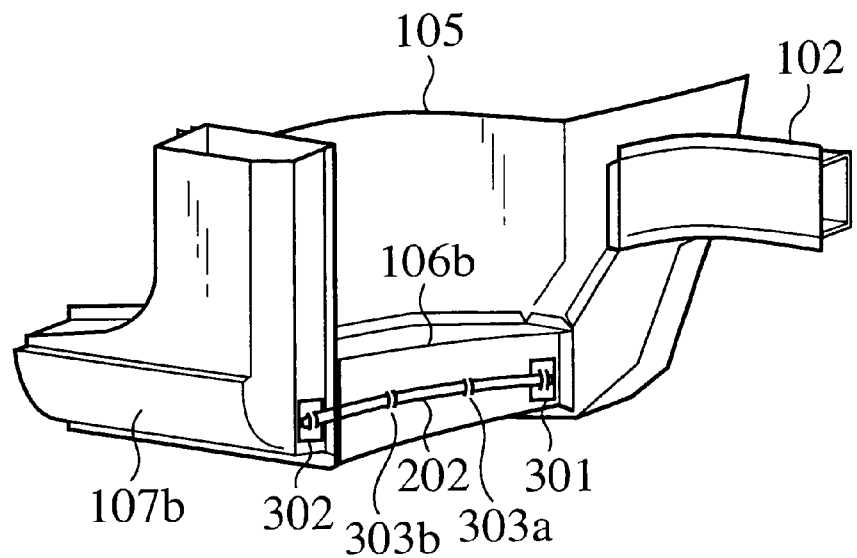
FIG. 16 is a perspective view of the front body structure of the seventh embodiment of the invention.

FIG. 16 shows the seventh embodiment of the invention. The feature of this embodiment resides in the adoption of a wire 202 as a member to be overlaid on both of the torque-box outer panel 106b and the side-frame outer panel 107b. In connection, the wire 202 is fastened to the torque-box outer panel 106b through a clasp 301, while the same wire 202 is fastened to the side-frame outer panel 107b through a clasp 302. At the front end of the torque-box outer panel 106b, the clasp 301 is fixed to the member's part (106B) joined to the side member 102 while penetrating both of the members 106b, 102. The clasp 302 is arranged in the vicinity of an intersection between the front end of the side-frame outer panel 107b and its part standing upright as a front pillar. Clips 303a, 303b are attached to the torque-box outer panel 106b at appropriate intervals, preventing the wire 202 from being swung during the vehicle's traveling. Additionally, the torque-box outer panel 106b is spot-welded to the side-frame outer panel 107b through respective flange parts folded outward, as similar to the body structure of FIG. 3.

According to the embodiment, owing to the continuous arrangement of the wire's extending on the torque-box outer panel 106b and up to the front end of the side-frame outer panel 107b, the wire 202 operates as a part of the torque-box outer panel 106b. When the tire presses the torque-box outer panel 106b at the vehicle collision, the impact (contact) force is exerted on the wire 201, in the form of a tensile load. Then, this tensile load is transmitted to the front end of the torque-box outer panel 106b and the side member 102 through the clasp 301 and also transmitted to the front end of the side-frame outer panel 107b through the clasp 302. That is, a load inputted via the tire is born by the bending strength of the side member 102 and the bending strength of the body side frame 107. Here, it is noted that the side member 102 is generally shaped to have an enlarged section at the rear end thereby to enhance the bending strength, while the side-frame outer panel 107b is provided, at its front end, with the upright front pillar of solid structure. Therefore, the body structure of the embodiment can obtain a remarkably high resistance.

According to the seventh embodiment, since the above fastening positions of the wire 202 to the side-frame outer panel 107b and the torque-box outer panel 106b may be shifted up, down, right and left so long as the resultant positions are included in an effective area of the tension of the wire 202, it is possible to enlarge the freedom of design for the body structure in comparison with that of the fourth embodiment.

8th. Embodiment

Figure 17:
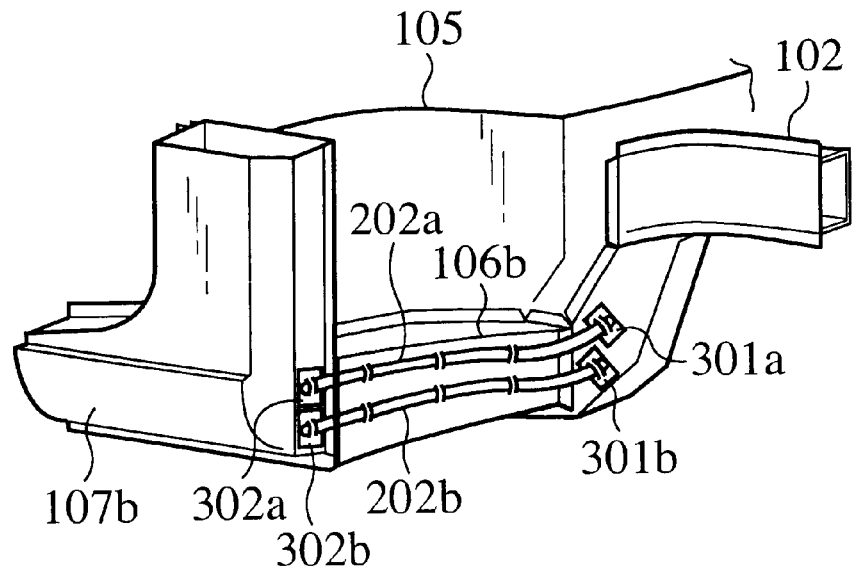
FIG. 17 is a perspective view of the front body structure of the eighth embodiment of the invention.

FIG. 17 shows the eighth embodiment of the present invention. According to the embodiment, there are provided two pieces of wires 202a, 202b in place of the wire 202 of the seventh embodiment. Owing to the establishment of two more wires, even if the position of contact between the tire 110 and the torque-box outer panel 106b changes due to the behavior of the vehicle, it is possible to transmit the impact load to the side-frame outer panel 107b stably. Additionally, two front clasps 301a, 301b corresponding to the clasp 301 of FIG. 16 are attached to the wall of the side member 102, while two rear clasps 302a, 302b corresponding to the clasp 302 of FIG. 16 are attached to the side-frame outer panel 107b. The upper clasp 302a is positioned in an upright part of the side-frame outer panel 107b, which forms a front pillar at the front end of the body side frame 107.

Consequently, a load inputted via the tire is born by the bending strength of the side member 102 and the bending strength of the body side frame 107. As similar to the seventh embodiment, the side member 102 is also shaped to have an enlarged section at the rear end thereby to enhance the bending strength, while the side-frame outer panel 107b is provided, at its front end, with the upright front pillar of solid structure. Therefore, the body structure of the embodiment can obtain a remarkably high resistance against the inputted load.

9th. Embodiment

Figure 18:
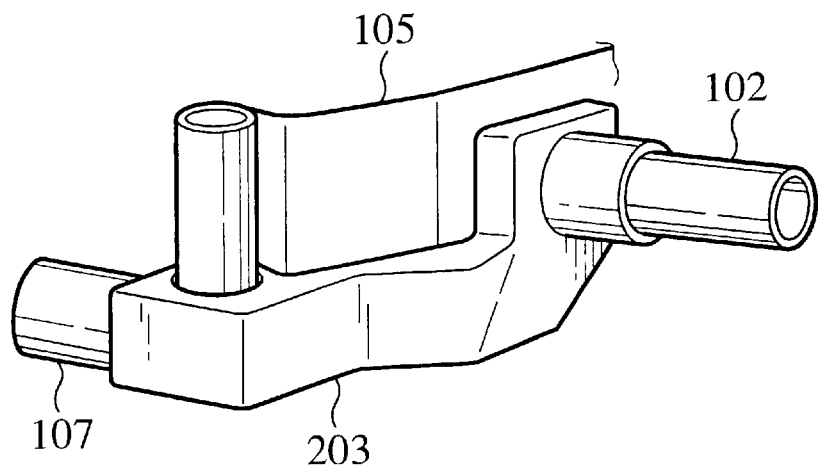
FIG. 18 is a perspective view of the front body structure of the ninth embodiment of the invention.
Figure 19A:
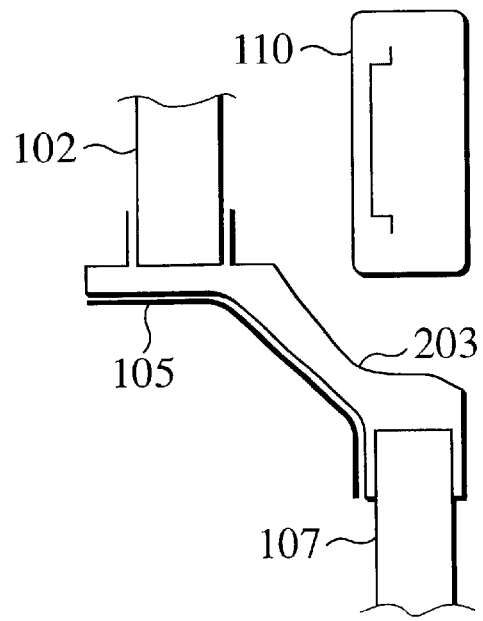
FIGS. 19A and 19B are views showing the operation of the front body structure of the ninth embodiment of the invention.
Figure 19B:
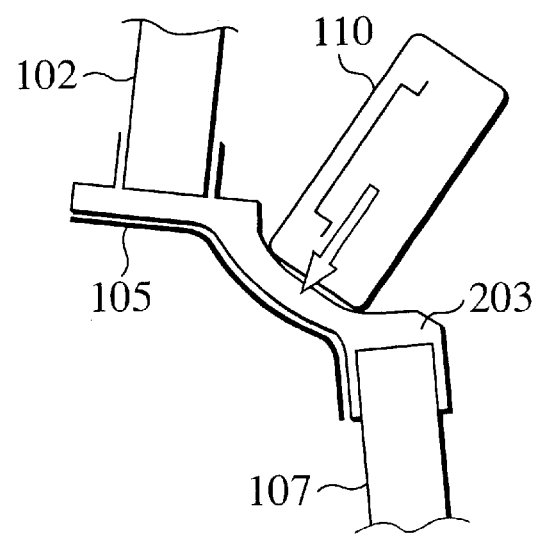

FIGS. 18, 19A and 19B show the ninth embodiment of the present invention. According to the embodiment, the side member 102 disposed in the engine room in the afore-and-aft direction is made of an extrusion whose rear end is adhesively assembled into a torque box cast 203 on a surface of the dash panel 105. The body side frame 107 forming a side framework of the cabin is also made of an extrusion whose front end is adhesively assembled into the torque box cast 203. The torque box cast 203 is in the form of a structure which corresponds to a part from the rear end of the side member to the front end of the body side frame through the torque box and which is molded out of casting dies to be drawn up and down.

FIGS. 19A and 19B show the operation and effect of the embodiment at the vehicle collision. FIG. 19A shows a state of the body structure before the vehicle collision. FIG. 19B shows a situation of the offset collision where the front tire 110 moves back while steering into the toe-out direction and finally comes into contact with the torque box cast 203.

When the tire 110 presses the torque box cast 203 in a direction inside the vehicle body, the body side frame 107 is also subjected to a force to withdraw its front end in the direction inside the vehicle body. According to the embodiment, since the front end of the body side frame 107 is assembled into the torque box cast 203, the force to push the torque box cast 203 inside of the vehicle body is transmitted to the front end of the body side frame 107, in the form of a sideways force. Even if the body side frame 107 is subjected to a force to pull its front end out of the torque box cast 203, a shearing force at the adhesive area around the frame 107 operates as a resistance against such a pulling force. Consequently, the bending strength of the whole body side frame 107 can be utilized as a resistance against the retreating of the tire 110.

Finally, it will be understood by those skilled in the art that the foregoing descriptions are nothing but some embodiments of the disclosed front body structure for vehicle. Besides these embodiments, various changes and modifications may be made to the present invention without departing from the spirit and scope of the invention.

What is claimed is:

1. A front body structure for a vehicle, comprising:

an engine room arranged in front of a vehicle cabin, for accommodating a power unit for the vehicle;

a dash panel disposed between the engine room and the vehicle cabin;

a side member arranged in each lateral side of the vehicle to extend from the engine room to the underside of a cabin floor defining the vehicle cabin, in a fore-and-aft direction of vehicle continuously;

a body side frame having a side-frame inner panel arranged inside the vehicle cabin and a side-frame outer panel arranged outside the vehicle cabin; and a torque box formed to extend from the vicinity of a joint between the side member and the dash panel to the body side frame, in the form of a box having a torquebox inner panel inside the vehicle cabin and a torque-box outer panel outside the vehicle cabin, wherein a front tire and a wheel are arranged on the side of the torque-box outer panel of the torque box, and the body side frame is connected with the torque box so that an outside surface of the side-frame outer panel is substantially connected an outside surface of the torque-box outer panel.

2. The front body structure of claim 1, wherein the side-frame outer panel and the torque-box outer panel are formed into one panel so that the outside surface of the side-frame outer panel connects the outside surface of the torque-box outer panel.

3. The front body structure of claim 1, wherein the side-frame outer panel and the torque-box outer panel are formed by different members respectively and laid to overlap each other so that an inner surface of the side-frame outer panel connects an inner surface of the torque-box outer panel.

4. The front body structure of claim 3, wherein the side-frame outer panel is connected with the torque-box outer panel by means of welding.

5. The front body structure of claim 4, wherein the side-frame outer panel and the torque-box outer panel are laid to overlap each other in the vicinity of the front end of the body side frame; and the side-frame outer panel is welded to the torque-box outer panel at their overlapping parts.

6. The front body structure of claim 3, wherein the side-frame outer panel is connected with the torque-box outer panel through an additional member.

7. The front body structure of claim 6, wherein the additional member comprises a plate which is laid to overlap with both of the side-frame outer panel and the torque-box outer panel; and the plate is welded to both of the side-frame outer panel and the torque-box outer panel at their overlapping parts.

8. The front body structure of claim 6, wherein the additional member comprises a wire which is laid to overlap with both of the side-frame outer panel and the torque-box outer panel; and the wire is fastened to both of the side-frame outer panel and the torque-box outer panel.

* * * * *